US00RE43721E

(19) United States
(12) Reissued Patent
Matsumoto et al.

(10) Patent Number: US RE43,721 E
(45) Date of Reissued Patent: Oct. 9, 2012

(54) KEYSTONE CORRECTION USING A PART OF EDGES OF A SCREEN

(75) Inventors: Morio Matsumoto, Matsumoto (JP); Shiki Furui, Suwa (JP)

(73) Assignee: Seiko Epson Corporation, Tokyo (JP)

(21) Appl. No.: 12/731,739

(22) Filed: Mar. 25, 2010

Related U.S. Patent Documents

Reissue of:

(64) Patent No.: 7,347,564
Issued: Mar. 25, 2008
Appl. No.: 11/206,099
Filed: Aug. 18, 2005

(30) Foreign Application Priority Data

Aug. 19, 2004 (JP) ..... 2004-239148

(51) Int. Cl.

| | |
|---|---|
| ***G03B 21/14*** | (2006.01) |
| ***H04N 3/23*** | (2006.01) |
| ***H04N 3/223*** | (2006.01) |
| ***G09G 5/00*** | (2006.01) |
| ***G06K 9/40*** | (2006.01) |

(52) U.S. Cl. ..... 353/69; 353/70; 348/746; 348/747; 345/647; 382/275

(58) Field of Classification Search ..... 353/69, 353/70, 101; 348/745–747, 806; 345/596, 345/647; 382/275

See application file for complete search history.

(56) References Cited

U.S. PATENT DOCUMENTS

| | | | |
|---|---|---|---|
| 6,753,907 | B1 | 6/2004 | Sukthankar et al. |
| 2001/0048483 | A1 | 12/2001 | Steinberg et al. |
| 2003/0223048 | A1 | 12/2003 | Kimura |
| 2004/0061838 | A1 | 4/2004 | Mochizuki et al. |
| 2005/0062939 | A1 | 3/2005 | Tamura |

FOREIGN PATENT DOCUMENTS

| | | |
|---|---|---|
| EP | 1 385 335 A1 | 1/2004 |
| JP | A-2002-062842 | 2/2002 |
| JP | A-2002-247614 | 8/2002 |
| JP | A-2003-289485 | 10/2003 |

OTHER PUBLICATIONS

Sukthankar et al., "Automatic Keystone Correction for Camera-Assisted Presentation Interfaces," XP-002346182, pp. 607-614, 2000.

*Primary Examiner* — Rochelle-Ann J Blackman
(74) *Attorney, Agent, or Firm* — Oliff & Berridge, PLC

(57) ABSTRACT

The projector comprises an image forming panel that forms an effective panel image for modulating the light into an image light in an image forming area of a panel surface, and an image capturing unit for capturing a specific projection area wherein the image light corresponding to a specific area in the image forming area is projected. The projector calculates one or more edges of the outside perimeter lines of the screen and of the specific projection area by detecting plural points in a captured image. Based on the detection results, a post-correction image forming area is calculated, and trapezoidal distortion is corrected by forming the effective panel image within the post-correction image forming area. When only three or less of the four edges of the outside perimeter lines of the screen are detected, the projector calculates the post-correction image forming area based on the position and slope of the detected edge within the captured image.

13 Claims, 11 Drawing Sheets

KEYSTONE CORRECTION USING A PART OF EDGES OF A SCREEN

Matter enclosed in heavy brackets [ ] appears in the original patent but forms no part of this reissue specification; matter printed in italics indicates the additions made by reissue.

CROSS REFERENCE TO RELATED APPLICATIONS

The present application claims the priority based on Japanese Patent Application No. 2004-239148 filed on Aug. 19, 2004, the disclosure of which is hereby incorporated herein by reference in its entirety.

BACKGROUND OF THE INVENTION

1. Field of the Invention

The present invention relates to projectors for displaying images through projecting light onto a screen, and, in particular, relates to technologies for keystone correction for correcting trapezoidal distortion of images on a screen.

2. Description of the Related Art

When displaying images on a screen using a projector, there may be trapezoidal distortion of the image that is displayed on the screen (hereinafter termed the "displayed image") given the relative positioning of the projector and the screen. There are known technologies for keystone correction by which to correct the trapezoidal distortion of the displayed image in such a case.

For example, in keystone correction, an image of the screen is captured using an image capturing device, such as a CCD, the frame (outside perimeter lines) of the screen is detected using the captured image, and, based on the shape of the frame of screen that has been detected, the image on the liquid crystal panel in the projector is formed through compression into a trapezoidal shape. (See, for example, JP2002-62842A and JP2002-247614A).

However, in the conventional technologies described above, it is necessary to detect all four of the edges of the screen frame in the captured image. The reason for this is that when the four edges of the screen frame are detected, it is possible to calculate the shape of the screen using each of the edges that have been detected. Consequently, conventionally, there has not been a known technology for keystone correction that takes into account cases wherein only three or less of the edges of the screen frame are detected.

SUMMARY OF THE INVENTION

An object of the present invention is to provide a technology that is capable of performing keystone correction in projecting an image on a screen using a projector even when only three or less of the edges of the screen frame are detected from a captured image.

In one aspect of the present invention, there is provided a projector for displaying an image on a screen. The projector comprises a light source, an image forming panel, an image capturing unit, an outside perimeter line detecting unit, a post-correction image forming area calculating unit, and a keystone correcting unit. The light source emits light. The image forming panel forms, in an image forming area of a panel surface, an effective panel image for modulating light that is emitted from the light source into an effective image light that represents an image. The image capturing unit generates a captured image by capturing at least a specific projection area wherein the image light, corresponding to a specific area within the image forming area, is projected. The outside perimeter line detecting unit calculates one or more edges of outside perimeter lines of the specific projection area and one or more edges of the screen, through analyzing the captured image and detecting plural points on the outside perimeter lines of the specific projection area and of the screen within the captured image. The post-correction image forming area calculating unit calculates, based on detection results by the outside perimeter line detecting unit, post-correction image forming area that is a part of the image forming area. The keystone correcting unit corrects trapezoidal distortion of an image that is displayed on the screen through forming of the effective panel image in the post-correction image forming area within the image forming area. When only three or less edges among four edges of the outside perimeter lines of the screen have been detected by the outside perimeter line detecting unit, the post-correction image forming area calculating unit calculates the post-correction image forming area based on a position and a slope of the detected edge within the captured image.

In this projector, when only three or less of the four edges of the outside perimeter lines of the screen can be detected using the outside perimeter line detecting unit, the post-correction image forming area is calculated based on the slope and position, in the captured image, of the detected edges, which are the edges of the outside perimeter lines of the screen that have been detected, to form an effective panel image within the calculated post-correction image forming area, to thereby perform keystone correction to correct the trapezoidal distortion of the image displayed on the screen. Consequently, it is possible to perform keystone correction when only three or less edges of the screen frame can be detected from the captured image.

The present invention can be realized in a various aspects. For example, the present invention can be realized in aspects such as a projector, an image projection method and device, an image correction method and device, a keystone correction method and device, a computer program for effecting the functions of such methods or devices, a recording medium for recording such a computer program, and data signals in which such a computer program is carried on the carrier wave.

These and other objects, features, aspects, and advantages of the present invention will become more apparent from the following detailed description of the preferred embodiments with the accompanying drawings.

DESCRIPTION OF THE PREFERRED EMBODIMENT

Next, aspects of the present invention will be described in the following order on the basis of embodiments:

A. Embodiment 1
A-1. Structure of the Projector
A-2. Keystone Correction Process
B. Embodiment 2
C. Basis for the Formulas for Calculating the Projection Angles and for Calculating the Vanishing Points
D. Variations

A. Embodiment 1

A-1. Structure of the Projector

Figure 1:
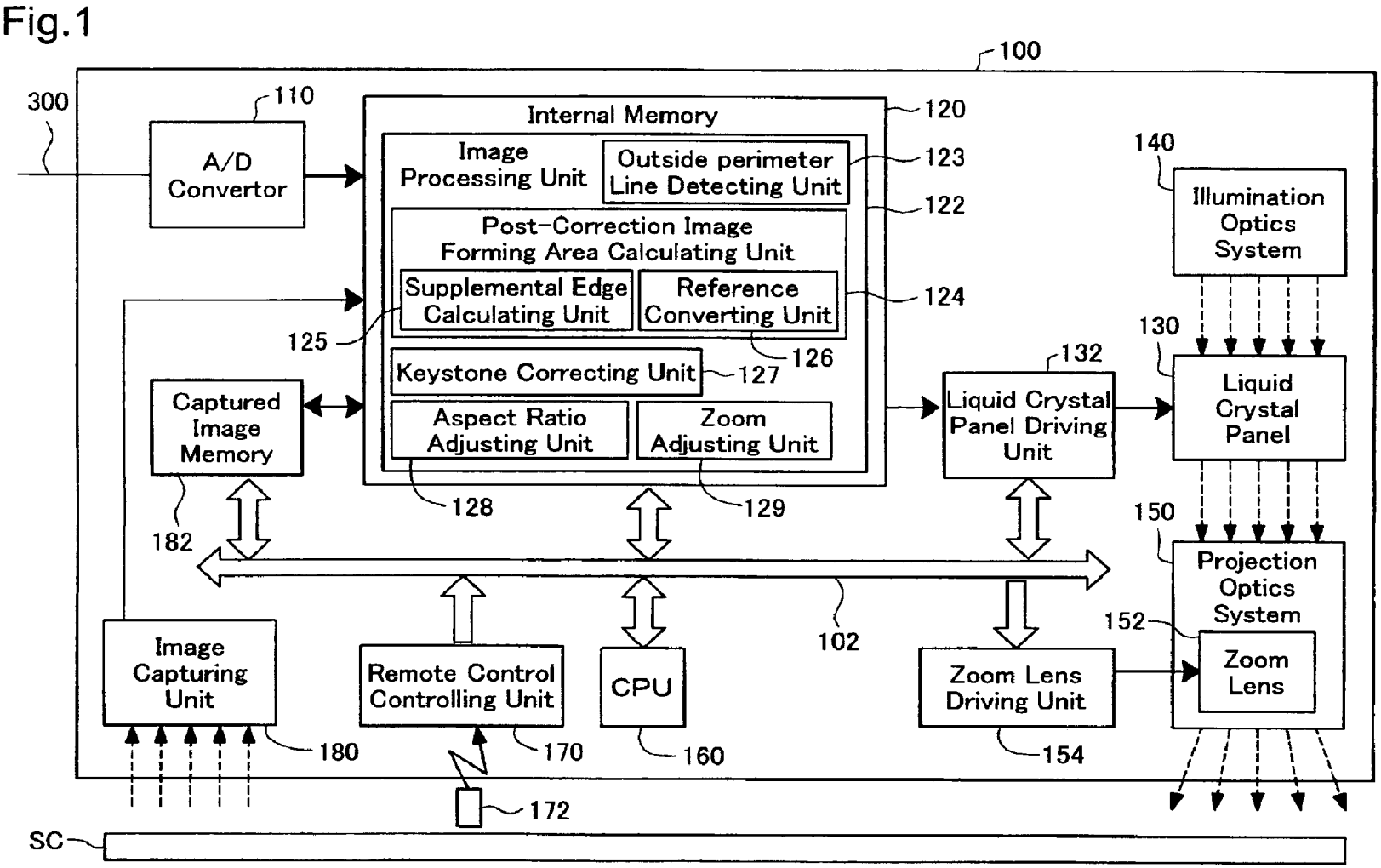
FIG. 1 is a block diagram showing schematically the structure of a projector as embodiment 1 according to the present invention.

FIG. 1 is a block diagram showing schematically the structure of a projector as embodiment 1 according to the present invention. The projector 100 projects image light that represents an image, to display an image (hereinafter termed the "displayed image") on a screen SC. The projector 100 comprises an A/D convertor 110, an internal memory 120, a liquid crystal panel 130 as a light valve, a liquid crystal panel driving unit 132, an illumination optics system 140, a projection optics system 150 that includes a zoom lens 152, a zoom lens driving unit 154, a CPU 160, a remote control controlling unit 170, a remote control 172, an image capturing unit 180, and a captured image memory 182. The internal memory 120, the liquid crystal panel driving unit 132, the zoom lens driving unit 154, the CPU 160, the remote control controlling unit 170, and the captured image memory 182 are connected together via a bus 102.

The A/D convertor 110 performs A/D conversion as necessary on the inputted image signals, which are inputted through a cable 300 from, for example, a DVD player, PC, or the like, not shown, to output a digital image signal.

The internal memory 120 stores a computer program that functions as an image processing unit 122. The image processing unit 122 adjusts the display status of the image (for example, the brightness, contrast, synchronization, tracking, color saturation, color tone, etc.) on the digital image signals outputted from the A/D convertor 110, and outputs the results to the liquid crystal panel driving unit 132. The image processing unit 122 includes the functions of an outside perimeter line detecting unit 123, a post-correction image forming area calculating unit 124, a keystone correction unit 127, an aspect ratio adjustment unit 128, and a zoom adjusting unit 129, while the post-correction image forming area calculating unit 124 includes the functions of a supplementary edge calculating unit 125 and a reference converting unit 126. The image processing unit 122 performs the keystone correction process described below, based on these functions.

The liquid crystal panel driving unit 132 drives a liquid crystal panel 130 based on the digital image signal that is inputted via the image processing unit 122. The liquid crystal panel 130 forms an image (hereinafter termed the "effective panel image PI") for modulating the illuminated light that is projected from the illumination optics system 140 into the effective image light that represents the image in an image forming area IF of the surface (hereinafter termed the "panel surface") of the liquid crystal panel 130.

Figure 2A:
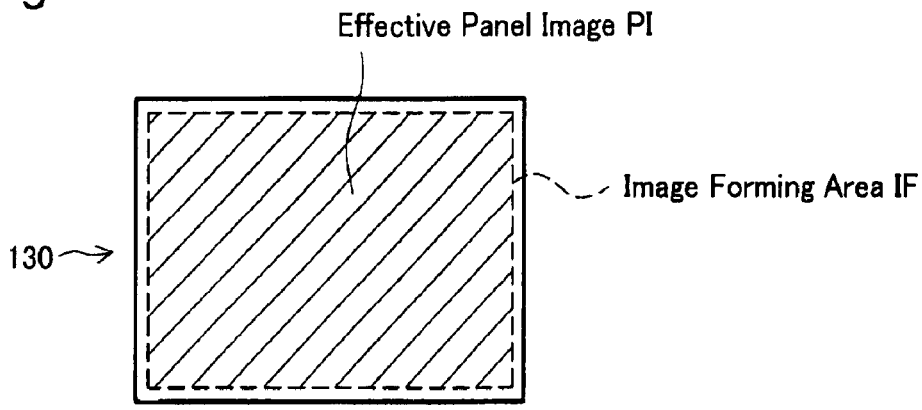
FIGS. 2A through 2C are explanatory diagrams showing schematically the relationship between the liquid crystal panel 130 and the image forming area IF.
Figure 2B:
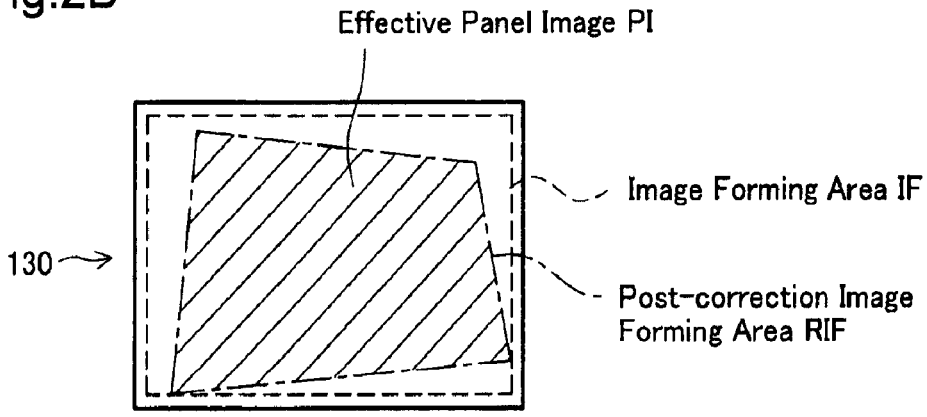
Figure 2C:
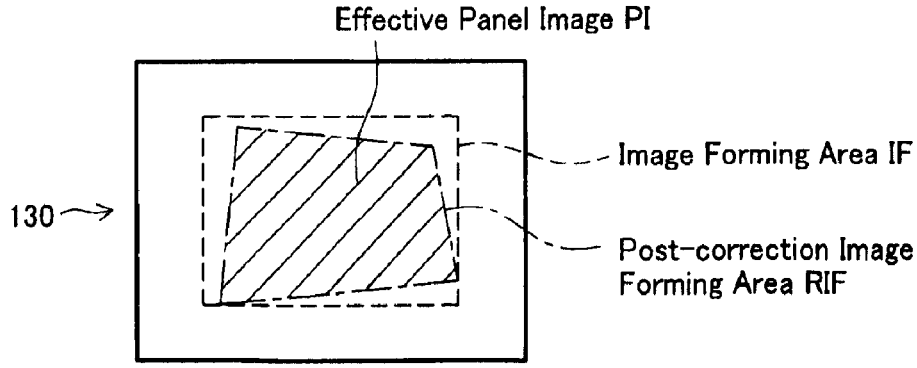

FIGS. 2A through 2C are explanatory diagrams showing schematically the relationship between the liquid crystal panel 130 and the image forming area IF. The image forming area IF refers to the area on the panel surface of the liquid crystal panel 130 wherein the effective panel image PI can be formed based on the digital image signals that are inputted into the liquid crystal panel driving unit 132. In FIGS. 2A through 2C, the image forming area IF is shown by the area that is surrounded by the broken line. As is shown in FIG. 2A, the image forming area IF in this embodiment is set in an area that is about two dots less on the all four edges than the entire panel surface of the liquid crystal panel 120. The size of the image forming area IF relative to the entire surface of the panel in the liquid crystal panel 130 may be set as desired.

In FIGS. 2A through 2C, the area wherein the effective panel image PI is formed is shown by the addition of the hatching. Normally, as shown in FIG. 2A the effective panel image PI is formed in the entire area of the image forming area IF. However, when performing a keystone correction process, as described below, the effective panel image PI is formed in a portion of the image forming area IF of the liquid crystal panel 130, as shown in FIG. 2B, where an all black image (shown by the blank area color in FIG. 2B) is formed in the remaining area of the image forming area IF. The area that is a portion of the image forming area IF wherein the effective panel image PI is formed after the keystone correction is called the "post-correction image forming area RIF." In FIGS. 2B and 2C, this post-correction image forming area RIF is shown as the area that is surrounded by the dashed line.

When the resolution of the digital image signal that is inputted into the liquid crystal panel driving unit 132 is low when compared to the resolution of the liquid crystal panel 130, then when the inputted digital image is formed as is, without enlargement, on the liquid crystal panel 130, then, as shown in FIG. 2C, the image forming area IF is set to an area that is even smaller than the entire panel of the liquid crystal panel 130, corresponding to the ratio of the resolutions described above.

The projection optics system 150 (FIG. 1) is equipped on the front surface of the case of the projector 100, and magnifies and projects the light that is modulated by the liquid crystal panel 130 into the image light. The zoom lens driving unit 150 can drive the zoom lens 152, equipped in the projection optics system 150, to change the state of the zoom. Here the state of the zoom means the degree of magnification (the magnification ratio) when projecting light through the liquid crystal panel 130 in the projection optics system 150. In other words, the zoom lens driving unit 154 is able to change the size of the displayed image that is displayed on the screen SC by driving the zoom lens 152.

The remote control controlling unit 170 receives instructions from a user through a remote control 172 and transmits those instructions to the CPU 160 through the bus 102. Even though the projector 100 in the present embodiment receives instructions from the user through the remote control 172 and the remote control controlling unit 170, the instructions from the user may be received through another structure, such as an operating panel.

The CPU 160 reads out a computer program implementing the image processing unit 122 from the internal memory 120, and projects an image onto the screen SC, performs image processes such as the keystone correction process, etc., described below, and so forth. Moreover, the CPU 160 controls the operations of the various units within the projector 100.

The image capturing unit 180 has a CCD camera and generates captured images. The captured images generated by the image capturing unit 180 are stored in the captured image memory 182 through the internal memory 120. The image capturing unit 180 may have another image capturing device rather than a CCD camera.

A-2. Keystone Correction Process

Figure 3:
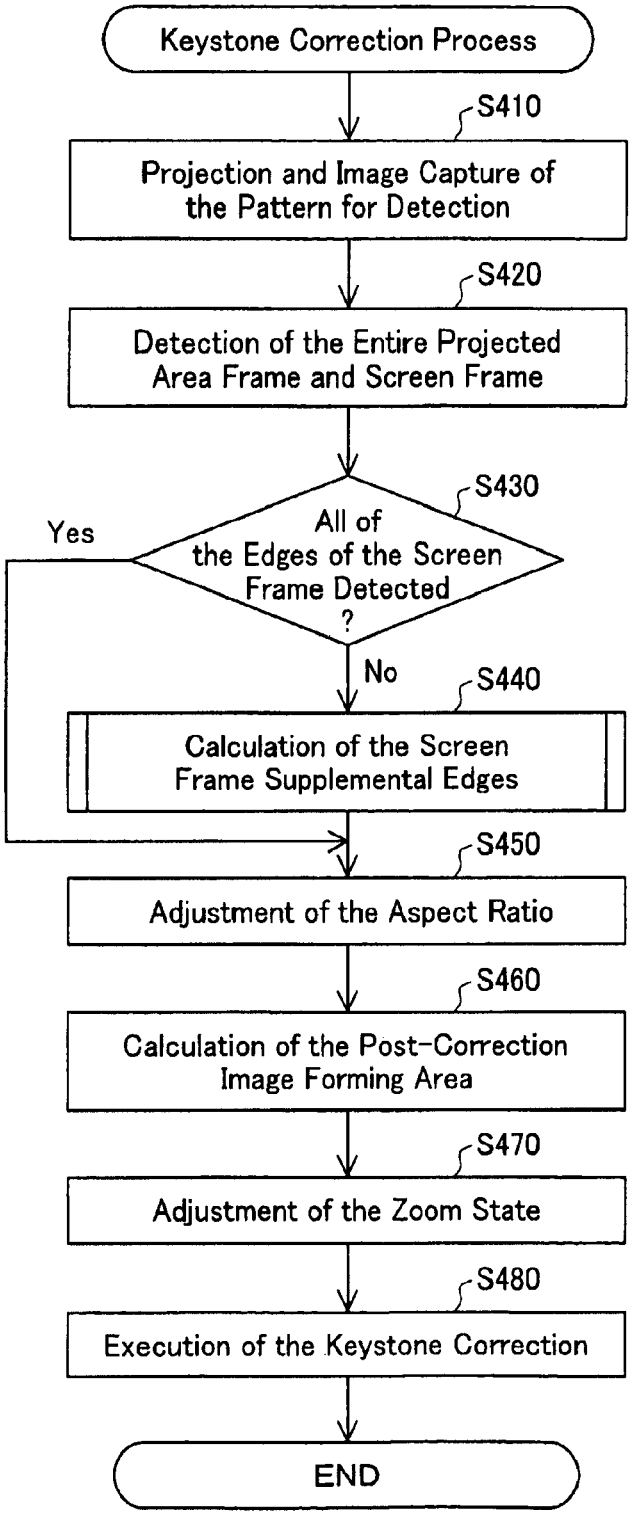
FIG. 3 is a flow chart showing the flow of the keystone correction process in the projector 100.

FIG. 3 is a flow chart showing the flow of the keystone correction process in the projector 100. The keystone correction process is a process that corrects the trapezoidal distortion of the displayed image on a screen SC. The keystone correction process is initiated according to an instruction through the remote control 172 from a user. The keystone correction process may be initiated automatically responsive to input of an image signal or, for example, when the power is turned on.

In Step S410, the image processing unit 122 (FIG. 1) projects a pattern for detection to the screen SC, and the image capturing unit 180 (FIG. 1) produces a captured image (hereinafter termed the "captured image CI") by capturing an image of the screen SC on which the pattern for detection is projected.

Figure 4A:
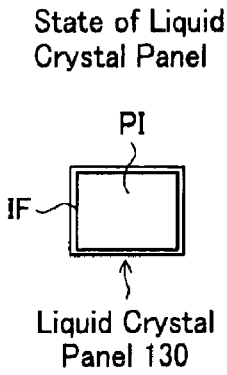
FIGS. 4A through 4L are explanatory diagrams showing an example of the state of the liquid crystal panel 130 and the screen SC, and the captured image CI.
Figure 4B:
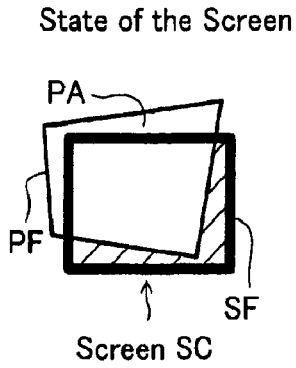
Figure 4C:
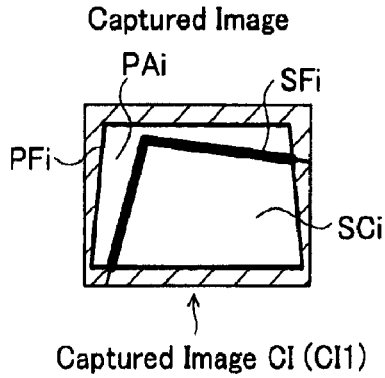
Figure 4D:
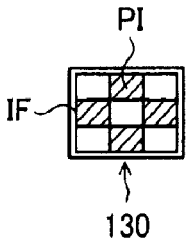
Figure 4E:
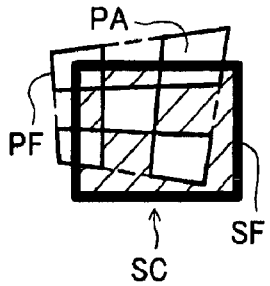
Figure 4F:
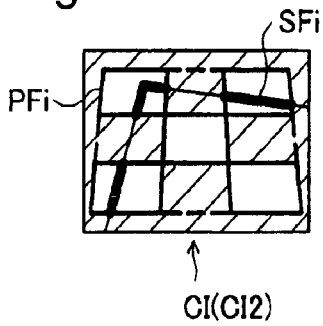
Figure 4G:
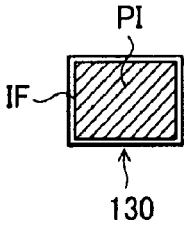
Figure 4H:
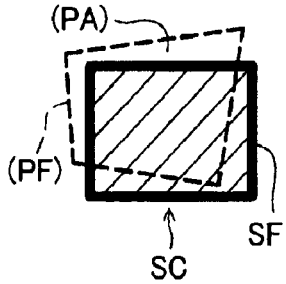
Figure 4I:
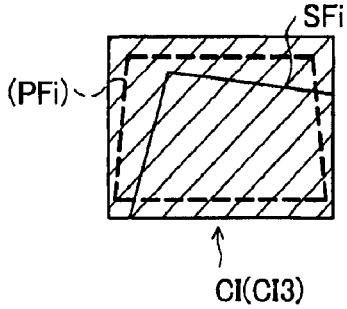
Figure 4J:
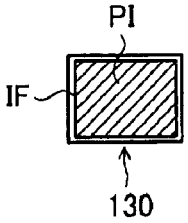
Figure 4K:
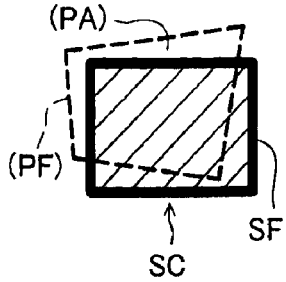
Figure 4L:
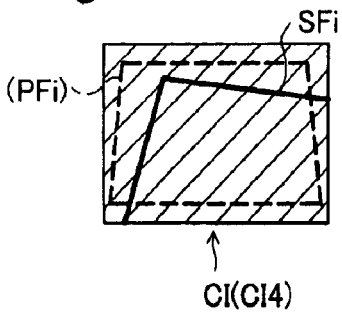

FIGS. 4A through 4L are explanatory diagrams showing an example of the state of the liquid crystal panel 130 and the screen SC, and the captured image CI. In the present embodiment, the projection of the pattern for detection and the production of the captured image CI are repeated four times. FIG. 4A shows the state of the liquid crystal panel 130 when the pattern for detection is projected and the captured image CI is generated the first time (hereinafter termed the "first repeat process"), and FIG. 4B shows the state of the screen SC at that time, and FIG. 4C shows the captured image CI at that time. Similarly, FIGS. 4D through 4F show the state when projecting the pattern for projection and generating the captured image CI for the second time (the second repeat process), and FIGS. 4G through 4I show the state when projecting the pattern for detection and generating the captured image CI for the third time (the third repeat process), while FIGS. 4J through 4L show the state when projecting the pattern for detection and generating the captured image CI for the fourth time (the fourth repeat process). In the present embodiment, three types of patterns, the first pattern through the third pattern, are used as the patterns for detection.

In the first repeat process, the first pattern for detection, which is an all-white pattern, is used. At the time of this first repeat process, as shown in FIG. 4A, an all-white pattern effective panel image PI is formed in the entire area of the image forming area IF of the liquid crystal panel 130. The lines following the outer periphery of the effective panel image PI shown in FIG. 4A are illustrated for convenience for showing the boundaries of the image forming area IF, and are not a part of the actual effective panel image PI. The same is true for FIGS. 4D, 4G, and 4J, described below.

In the present embodiment, the screen SC has a black screen frame SF that follows the outer periphery, where, in FIGS. 4B, 4E, 4H, and 4K, the screen frame SF is shown by the heavy lines. During the first repeat process, the area surrounded by the thin solid lines in FIG. 4B is where the all-white pattern displayed image is displayed. In the example in FIG. 4B, the displayed image extends beyond the screen SC, and is displayed also on the surface of the wall that is behind the screen SC. Moreover, there is trapezoidal distortion in the displayed image. Here, in FIG. 4B the area surrounded by the thin solid line, wherein the all-white pattern is displayed, is an area on the screen SC and on the wall behind the screen SC, and it is an area wherein the image light corresponding to the area of the entire image forming area IF of the liquid crystal panel 130 is projected; this area will be referred to as the "entire projected area PA." Here, the image light corresponding to the area of the entire image forming area IF of the liquid crystal panel 130 refers to the image light that is projected when the effective panel image PI is formed in the entire area within the image forming area IF of the liquid crystal panel 130. The line that follows the outer periphery of the entire projected area PA shown in FIG. 4B is termed the entire projected area frame PF. In FIG. 4B, the area of the screen SC whereon the image light is not projected is indicated with hatching.

At can be seen in FIG. 4B, when, in the example in FIGS. 4A through 4C, the effective panel image PI is formed in the entire area of the image forming area IF of the liquid crystal panel 130 to project the image, the displayed image extends off of the screen SC, and there is also trapezoidal distortion. The keystone correction process in the present embodiment is a process that causes the displayed image to be contained within the screen SC, and that corrects the trapezoidal distortion of the displayed image so that each of the edges of the outside perimeter lines of the displayed image will be parallel to each of the edges of the screen frame SF.

In the captured image CI captured in the first repeat process (hereinafter termed the "first captured image CI 1"), the all-white displayed image projected onto the entire projected area PA and the screen SC are photographed as shown in FIG. 4C. The entire projected area in the captured image CI is indicated by PAi, the entire projected area frame is indicated by PFi, the screen is indicated by SCi and the screen frame is indicated by SFi.

As shown in FIG. 4C, the entirety of the entire projected area PAi is included in the captured image CI. This is because the image capturing unit 180 (FIG. 1) is set with a setting position and image angle so as to be able to capture an image of an area that includes the entire projected area PA. On the other hand, in the example in FIG. 4C, only a part of the screen SCi is photographed in the captured image CI. In the projected image CI, even though the entire projected area frame PFi is essentially rectangular, there is some small amount of trapezoidal distortion. This is because even though the optical axis of the lens of the CCD camera in the image capturing unit 180 (FIG. 1) is substantially parallel to the optical axis of the projection optics system 150, it is not exactly parallel.

In the first captured image CI1 shown in FIG. 4C, the all-white pattern is projected into the entire projected area PAi, and an image in the entire projected area PAi is brighter than an image in an area that is outside of the entire projected area PAi. Within the entire projected area PAi, the screen frame SFi is clearly photographed, because the image light fulfills the role of the illumination light for the screen frame SFi.

The second repeat process is performed using the second pattern for detection, which is a black and white checkerboard pattern. The second repeat process is performed in order to detect accurately the entire projected area frame PFi in Step S420 described below. At the time of the second repeat process, an effective panel image PI that is a 3×3 black and white checkerboard pattern is formed in the image forming area IF of the liquid crystal panel 130, as shown in FIG. 4D. In FIG. 4D, the parts with hatching indicate the parts that are black.

At the time of the second repeat process, the displayed image, which is the checkerboard pattern, is displayed extending off of the screen SC, as shown in FIG. 4E. In the entire projected area PA, the area corresponding to the black parts of the effective pattern image PI (the parts with the hatching in FIG. 4D) is the area wherein the image light is not projected. Consequently, the image light is not projected onto the parts wherein the hatching has been added on the screen SC in FIG. 4E. The captured image CI, for which the image has been captured in the second repeat process (hereinafter termed the "second captured image CI2") will be as shown in FIG. 4F.

In the third repeat process, a third pattern for detection, which is an all black pattern, is used. The third repeat process is performed in order to increase the accuracy of the detection of the entire projected area frame PFi and the screen frame SFi in Step S420 described below. In the third repeat process, an effective panel image PI that is entirely black is formed in the image forming area IF of the liquid crystal panel 130, as shown in FIG. 4G.

The pattern for detection in the third repeat process is an entirely black pattern, and so image light is not projected. Consequently, in the third repeat process nothing is displayed on the screen SC, as shown in FIG. 4H. In FIG. 4H the entire projected area frame PF of the entire projected area PA is shown for reference using a broken line.

The captured image CI in the third repeat process (hereinafter termed the "third captured image CI3") will be as shown in FIG. 4I. Here, the image capturing in the third repeat process is performed using the same exposure value as the exposure value in the image capturing in the first repeat process. Because of this, the third captured image CI3, captured in the third repeat process wherein no image light is projected as the illumination light is an image that is dark overall, and thus is a state wherein the screen frame SFi is essentially undetectable. While in the third captured image CI3 the entire projected area frame PFi is not photographed, but, in FIG. 4I the position corresponding to the entire projected area frame PFi is indicated, for reference, by a broken line.

The fourth repeat process is performed using a third pattern for detection, which is an all-black pattern, the same as in the third repeat process. The difference from the third repeat process is in the point that the image capturing of the captured image CI is performed through the use of an automatic exposure mode. The fourth repeat process is performed in order to supplement the detection of the screen frame SFi in Step S420 explained below. The state of the liquid crystal panel 130 (in FIG. 4J) and the state of the screen SC (in FIG. 4K) in the fourth repeat process are the same as in the third repeat process.

The captured image CI in the fourth repeat process (hereinafter termed the "fourth captured image CI4") is as shown in FIG. 4L. Because the image capturing in the fourth repeat process is performed using automatic exposure, a comparison of the fourth captured image CI4 and the third captured image CI3 produces an image wherein the detection of the screen frame SFi is easy.

In Step S420 (FIG. 3) the outside perimeter line detecting unit 123 (FIG. 1) analyses the captured images CI to detect the screen frame SFi and the entire projected area frame PFi in the captured images CI. Here the detection of the screen frame SFi and the entire projected area frame PFi is performed through detecting desired points on the screen frame SFi and the entire projected area frame PFi and then calculating, based on the detected points, the screen frame SFi and the entire projected area frame PFi. The detection of the desired points on the screen frame SFi and on the entire projected area frame PFi is performed through measuring the contrast ratios between neighbor pixels in the four captured images CI generated in the Step S410 to extract the pixels with the greatest contrast ratios. The detection of the desired points on the screen frame SFi and the entire projected area frame PFi may be performed on each of the four vertices, of the screen frame SFi and the entire projected area frame PFi, for example, or may be performed on, for example, two points for each of the edges of the screen frame SFi and the entire projected area frame PFi.

In the first captured image CI1 shown in FIG. 4C, the contrast ratio is large at the entire projected area frame PFi and the screen frame SFi, so the entire projected area frame PFi and the screen frame SFi can be detected by measuring the contrast ratios within the first captured image CI1. In the present embodiment, the detection of the entire projected area frame PFi and the screen frame SFi is performed again after subtracting the pixel values of the third captured image CI3 from the pixel values of the first captured image CI1. This is intended to improve the accuracy of detection. For example, if a fluorescent lamp illuminating the screen SC, the fluorescent lamp will also be photographed in the captured images CI. In this case, the outside perimeter line detecting unit 123 (FIG. 1) may mistake the fluorescent lamp that is photographed in the first captured image CI1 as the entire projected area frame PFi and the screen frame SFi. Here, the third captured image CI3 is an image that is captured using the same exposure value as when capturing the image in the first captured image CI1, and so the fluorescent lamp is photographed in the same manner as in the first captured image CI1. Consequently, by subtracting the pixel values of the third captured image CI3 from the pixel values in the first captured image CI1, the accuracy of the detection can be improved because the occurrences of erroneous detection can be controlled in this way by subtracting the pixel values due to the fluorescent lamp that was photographed.

Similarly, an analysis of the second captured image CI2 shown in FIG. 4F is also performed. From the second captured image CI2 the borderlines between the white parts and the black parts of the checkerboard pattern are detected along with the entire projected area frame PFi and the screen frame SFi. In the present example embodiment, within these borderlines, the borderlines of the white area in the center of the checkerboard pattern (hereinafter termed "the center part borderlines") can be used to calculate the position of the entire projected area frame PFi. As is shown in the example in FIGS. 4A through 4L, when the entire projected area PA is not contained within the screen SC, the position and shape of the entire projected area PF may vary depending on the state of the wall behind the screen SC. In contrast, because in the majority of the cases, the center part borderlines are within the screen SC, detecting the center part border lines and calculating the position of the entire projected area frame PFi through performing a specific conversion regarding the center part borderline can calculate the entire projected area frame PFi accurately.

Moreover, similarly, an analysis of the fourth captured image CI4 shown in FIG. 4L is also performed. The image capturing for the fourth captured image CI4 was performed with automatic exposure, enabling the detection of the screen frame SFi. Although in the detection of the screen frame SFi in the fourth captured image CI4 it is not necessarily possible to have a clear detection when compared to the detection in the first captured image CI1, it is possible to detect those portions of the screen frame SFi which are outside the entire projected area PAi for which detection is difficult using the first captured image CI1. Consequently, the screen frame SFi can be detected more accurately through the additional use of the detection results of the screen frame SFi in the fourth captured image CI4.

As described above, the entire projected area frame PFi and the screen frame SFi are detected in the captured images CI. In the example in FIGS. 4A through 4L, the screen frame SFi is detected for only two edges, the left edge and the top edge, and the other two edges, the bottom edge and the right edge, are not detected. In the explanation below, the edges of the screen frame SFi that are not detected in the captured images CI will be termed the "non-detected edges."

In Step S430 (FIG. 3), the post-correction image forming area calculating unit 124 (FIG. 1) determines whether or not all of the four edges of the screen frame SFi in the captured images CI have been detected, or in other words, whether or not there are non-detected edges. In the keystone correction process according to the present embodiment, as will be described below, a post-correction image forming area RIF (FIGS. 2B and 2C) is calculated from the relationships between the entire projected image area frame PFi and the screen frame SFi. Because of this, when there are non-detected edges in the screen frame SFi the post-correction image forming area RIF cannot be calculated directly. At such a time, the screen frame supplementary edge calculating process (Step S440), described below, will be performed. Consequently, when it is determined that there are non-detected edges in Step S430, then processing proceeds to Step S440. On the other hand, if, in Step S430, it is determined that the four edges of the screen frame SFi have been detected, then Step S440 is skipped and processing advances to Step S450. In the example in FIGS. 4A through 4L, there are non-detected edges, and thus processing advances to Step S440.

In Step 440 (FIG. 3) the supplemental edge calculating unit 125 (FIG. 1) performs the screen frame supplemental calculating process. The screen frame supplemental edge calculating process is a process for calculating supplemental edge(s) for obtaining the edge(s) of the screen frame SFi that were not detected in the captured images CI (i.e., the non-detected edges).

Figure 5:
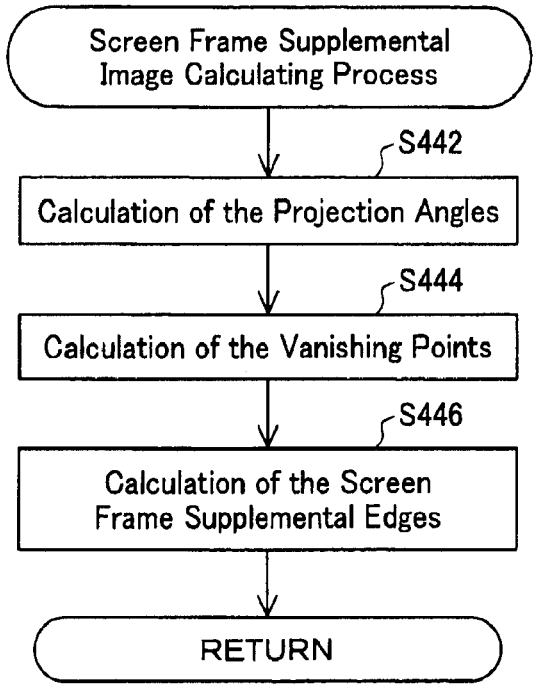
FIG. 5 is a flow chart showing the flow of the screen frame supplemental edge calculating process.

FIG. 5 is a flow chart showing the flow of the screen frame supplemental edge calculating process. The screen frame supplemental edge calculating process is performed using a variety of calculation formulas. In the explanation below the calculation formulas are given a priori, and the basis for the calculation formulas is described after the embodiments.

In Step S442, the supplemental edge calculating unit 125 (FIG. 1) calculates the projection angle. Here the projection angle means the relative angle between the optical axis of the CCD of the image capturing unit 180 and the screen SC.

Figure 6:
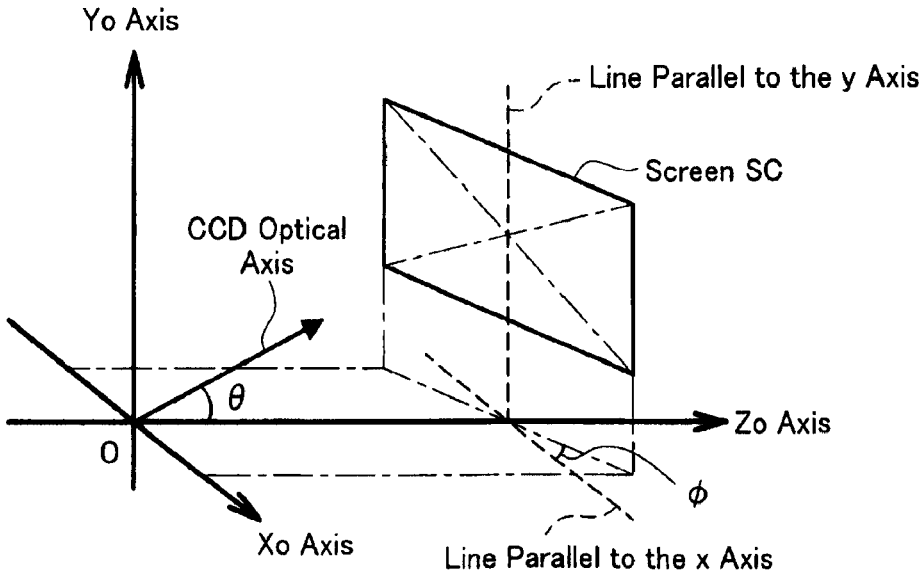
FIG. 6 is an explanatory diagram showing the projection angle.

FIG. 6 is an explanatory diagram showing the projection angle. In the coordinate system in FIG. 6, the origin O is positioned on the center of the CCD of the image capturing unit 180, the Yo axis is parallel to the right edge and the left edge of the screen SC, and the Zo axis is in a direction that is perpendicular to a line that is parallel to the right edge and the left edge, passing through the center point of the screen SC. At this time, the projection angle in the vertical direction (hereinafter termed the "vertical projection angle θ") is defined as the angle θ between the Xo-Zo plane and the optical axis of the CCD of the image capturing unit 180, and the projection angle in the horizontal direction (hereinafter termed the horizontal projection angle ϕ") is defined as the angle ϕ between the Xo-Yo plane and the screen SC. The coordinate system and the projection angles are defined as shown in FIG. 6 for reasons of convenience, and may also be defined in other ways as desired.

In the present embodiment, the supplemental edge calculating unit 125 (FIG. 1) calculates the projection angles θ and ϕ based on the position and slope, in the captured images CI, of the screen frame SFi, detected in Step S420 (FIG. 3). In other words, the supplemental edge calculating unit 125 calculates the linear equations for each of the four edges of the screen frame SFi in the captured images CI, and use the slopes and intercepts of the linear equations to calculate the projection angles θ and ϕ.

Figure 7:
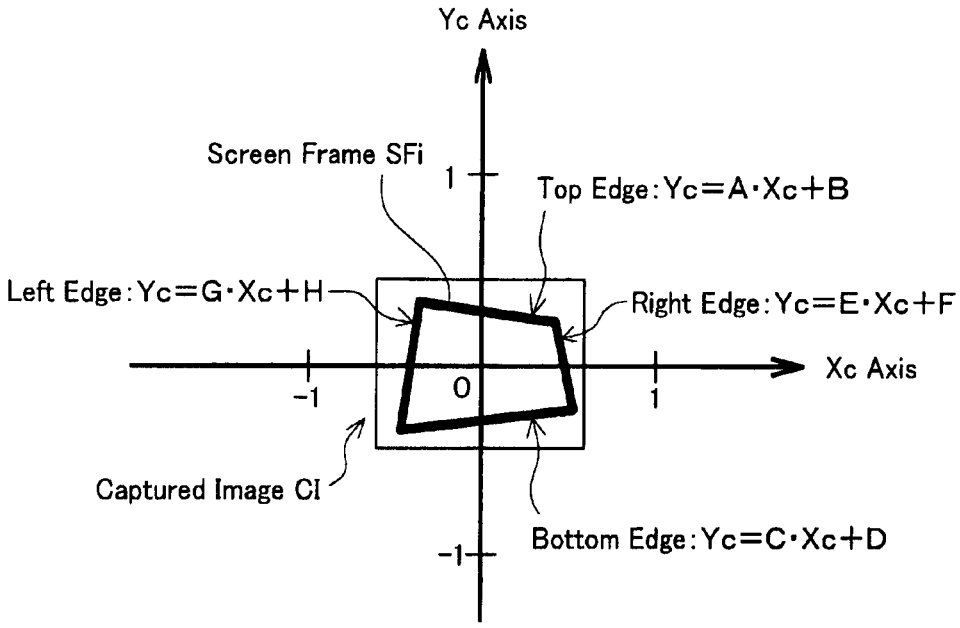
FIG. 7 is an explanatory drawing showing the linear equations for each of the edges of the screen frame SFi in the captured images CI.

FIG. 7 is an explanatory drawing showing the linear equations for each of the edges of the screen frame SFi in the captured images CI. The coordinate system in FIG. 7 is the coordinate system in the captured image CI, where the center point of the captured image CI is used as the origin O, the Xc axis is in the vertical direction, and the Yc axis is in the horizontal direction. The coordinate values of the points in the ±45° directions of the range of viewing angles of the CCD in the image capturing unit 180 are set to be, respectively, ±1. As is shown in FIG. 7, in the captured image CI, the equations for each of the edges of the screen frame SFi are expressed by the following equations (1) through (4).

$$Yc=A\cdot Xc+B \quad A(1)$$

$$Yc=C\cdot Xc+D \quad A(2)$$

$$Yc=E\cdot Xc+F \quad A(3)$$

$$Yc=G\cdot Xc+H \quad A(4)$$

At this time, the vertical projection angle θ can be calculated by one of the following equations (5) through (7).

$$\theta = -\text{Arc tan}\left(\frac{AD-CB}{A-C}\right) \quad A(5)$$

$$\theta = \text{Arc tan}\,\frac{1}{F} \quad A(6)$$

$$\theta = \text{Arc tan}\,\frac{1}{H} \quad A(7)$$

The horizontal projection angle ϕ can be calculated by either equation (8) or (9), below.

$$\phi = -\text{Arc tan}\left(\frac{A}{B\cdot\cos\theta+\sin\theta}\right) \quad A(8)$$

$$\phi = -\text{Arc tan}\left(\frac{C}{D\cdot\cos\theta+\sin\theta}\right) \quad A(9)$$

The supplemental edge calculating unit 125 (FIG. 1) first calculates the vertical projection angle θ. When the top edge and the bottom edge of the screen frame SFi have been detected, then equation (5) is used to calculate the vertical projection angle θ. If the right edge has been detected, then equation (6) is used, and if the left edge has been detected, then the equation (7) is used to calculate the vertical projection angle θ. In the example shown in FIGS. 4A through 4L, the top edge and the right edge have been detected for the screen frame SFi, and at this time the equation (7) is used to calculate the vertical projection angle θ.

Next the supplemental edge detecting unit 125 calculates the horizontal projection angle ϕ. When the top edge has been detected, then equation (8) is used, and when the bottom edge has been detected, then equation (9) is used to detect the horizontal projection angle ϕ. In the example in FIGS. 4 through 4L, equation (8) is used to calculate the horizontal projection angle ϕ.

As is clear from the calculation formulas for the vertical projection angle θ and the horizontal projection angle ϕ, in the present embodiment it is necessary to detect either the top edge or the bottom edge and at least one edge other than the top edge and the bottom edge among the edges of the screen frame SFi in order to calculate the vertical projection angle θ and the horizontal projection angle ϕ.

Figure 8:
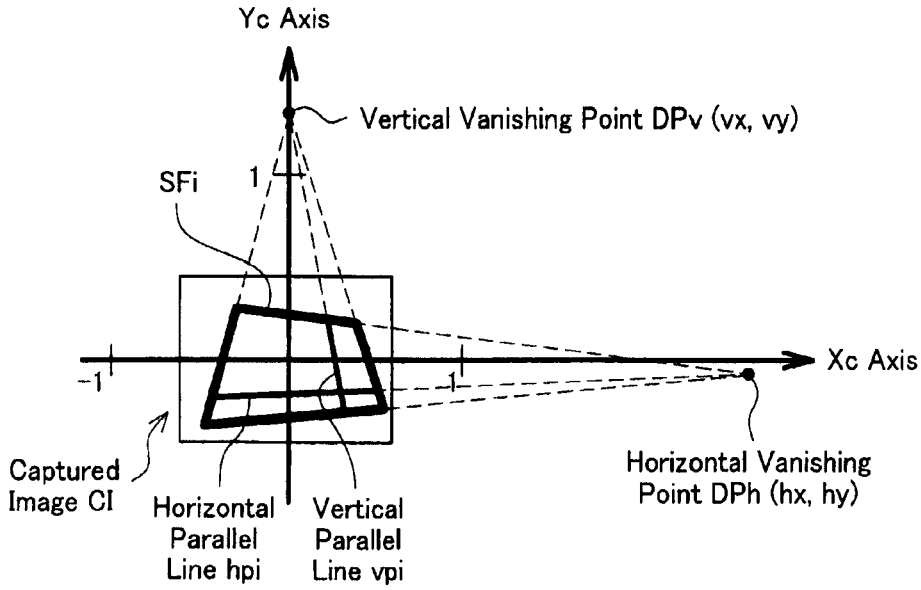
FIG. 8 is an explanatory drawing for explaining the vanishing points.

In Step S444 (FIG. 5) the supplemental edge detecting unit 125 (FIG. 1) calculates the vanishing points using the projection angles calculated in Step S442. FIG. 8 is an explanatory drawing for explaining the vanishing points. The vanishing points are the point through which any given straight line parallel to a edge of the screen frame SF of the existing screen SC pass in the coordinate system in the captured image CI. There is a vertical vanishing point DPv and a horizontal vanishing point DPh. The vertical vanishing point DPv and the horizontal vanishing point DPh are shown in FIG. 8. As shown in FIG. 8, the right edge and the left edge of the screen frame SFi, in the coordinate system of the captured image CI, both pass through the vertical vanishing point DPv and the top edge and bottom edge both pass through the horizontal vanishing point DPh. When an image is captured of, for example, lines (vertical parallel lines vp) that are parallel to the right edge and left edge of the screen frame SF, and photographed in the captured image these vertical parallel lines (indicated vpi in FIG. 8) all pass through the vertical vanishing point DPv. Similarly, when lines that are parallel to the top edge and bottom edge of the screen frame SF (horizontal parallel lines hp), and photographed on the captured image CI, these horizontal parallel lines (indicated by hpi in FIG. 8) all pass through the horizontal vanishing point DPh. In other words, any given straight lines that are parallel to the edges of the screen frame SF will, in a captured image CI that photographs said lines, pass through one of the vanishing points. However, when the projection angles are 0, the lines will not pass through vanishing points.

Defining as "(vx, vy)" the coordinates of the vertical vanishing point DPv, and defining as "(hx, hy)" the coordinates of the horizontal vanishing point DPh, the coordinates of the vanishing points can be calculated by equations (10) and (11), shown below, through the use of the projection angles.

$$(x, y) = \left(0, \frac{1}{\tan\theta}\right) \quad A(10)$$

$$(x, y) = \left(\frac{1}{\tan\theta \times \cos\theta}, -\tan\theta\right) \quad A(11)$$

Figure 9A:
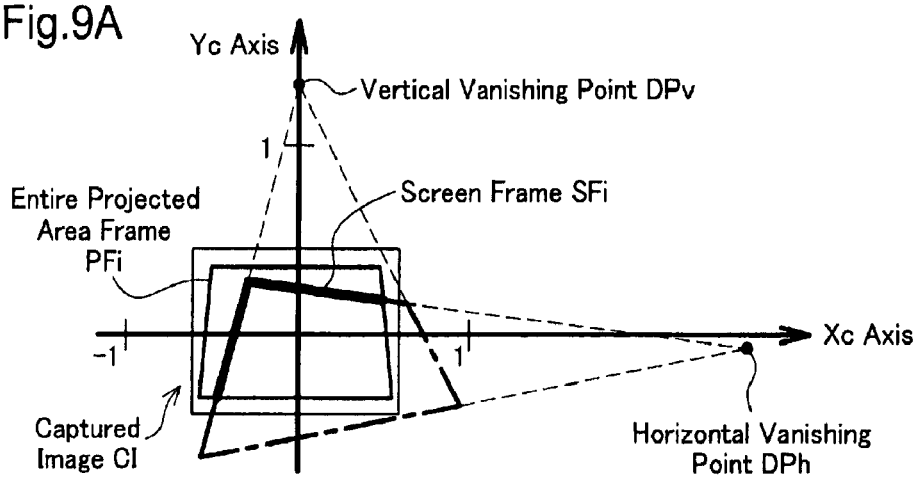
FIGS. 9A through 9C are explanatory diagrams showing examples of the method of calculating the supplemental edge CS of the screen frame SFi.
Figure 9B:
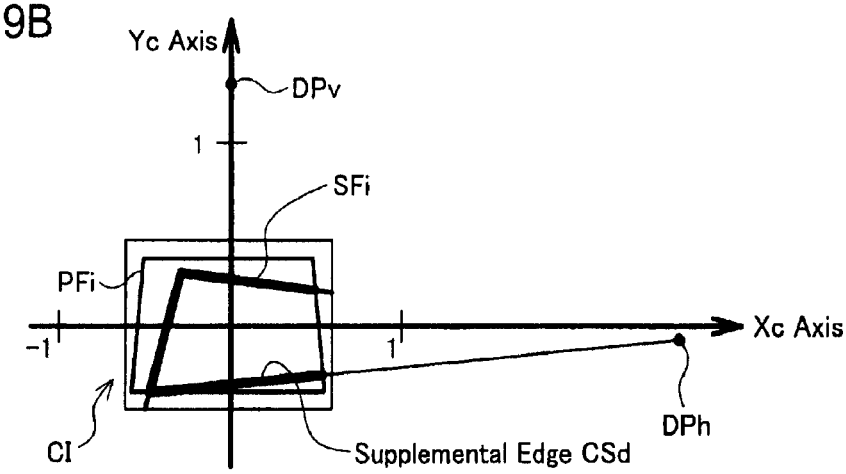
Figure 9C:
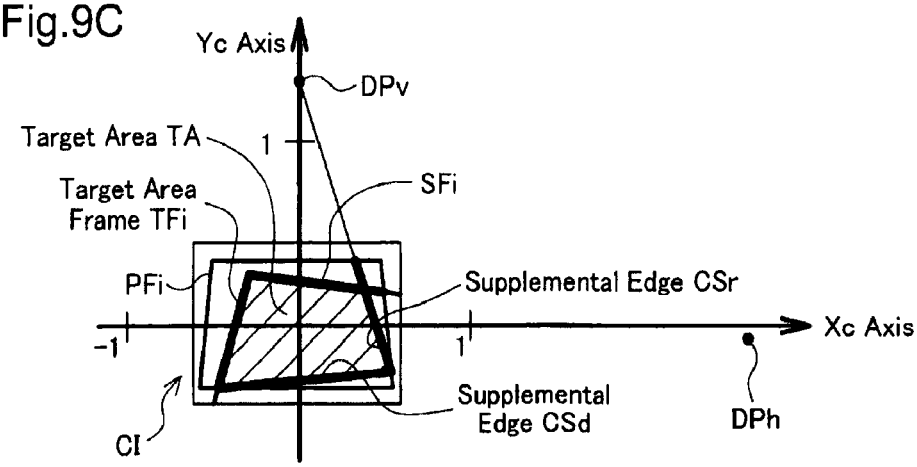

In Step S446 (FIG. 5) the supplemental edge calculating unit 125 (FIG. 1) calculates the supplemental edge CS of the screen frame SFi. FIGS. 9A through 9C are explanatory diagrams showing examples of the method of calculating the supplemental edge CS of the screen frame SFi. In the example in FIGS. 9A through 9C, as explained using FIGS. 4A through 4L, the bottom and right edges of the screen frame SFi are non-detected edges. Consequently, the supplemental edge calculating unit 125 calculates the supplemental edges CS corresponding to the bottom and right edges. The calculation of the supplemental edges CS is performed so that straight lines extending from the supplemental edges CS will pass through the vanishing points, and so that the supplemental edges will be positioned within the entire projected area PAi.

FIG. 9A shows the state prior to the calculation of the supplemental edge CS. For reference, the parts that are not detected within the screen frame SFi are shown in FIG. 9A by dashed lines. The supplemental edge calculating unit 125 first calculates the supplemental edge CSd corresponding to the bottom edge, as shown in FIG. 9B. Specifically, the part of the line that connects the horizontal vanishing point DPh and the intersection between the left edge of the screen frame SFi and the entire projected area frame PFi, and that is included within the entire projected area PAi, is defined as the supplemental edge CSd corresponding to the bottom edge.

Next the supplemental edge calculating unit 125 calculates the supplemental edge CSr, corresponding to the right edge, as shown in FIG. 9C. Specifically, the part of the line that connects the vertical vanishing point DPv and the intersection between the supplemental edge CSd and the entire projected area frame PFi, what is included in the entire projected area PAi is defined as the supplemental edge CSr that corresponds to the right edge.

The supplemental edges CS that correspond to the non-detected edges are calculated as described above. The supplemental edges CS are calculated as line segments on lines that pass through the vanishing points, and thus lines on the actual screen SC, corresponding to the supplemental edges CS are lines that are parallel to the edges of the screen frame SF corresponding to the non-detected edges. Moreover, the supplemental edges CS are calculated so as to be positioned within the entire projected area PAi, and thus the lines on the actual screen SC corresponding to the supplemental edges CS are positioned within the entire projected area PA. Consequently, the area on the actual screen SC corresponding to the area surrounded by the screen frame SFi and the supplemental edges CS (hereinafter termed the "target area TA"), marked by hatching in FIG. 9C is an area that is included within the entire projected area PA, and each of the outside perimeter lines of the area is parallel to one of the edges of the screen frame SF. Consequently, if keystone correction is performed so as to display the displayed image in an area on the actual screen SC that corresponds to the target area TA, then the displayed image would not extend off of the screen SC, and can be displayed without trapezoidal distortion. In the explanation below the outside perimeter lines of the target area TA are known as the "target area frame TF," and in particular, the target area frame TF in a captured image CI is indicated by the "target area frame TFi."

In the example in FIGS. 9A through 9C the supplemental edge CSd corresponding to the bottom edge is calculated first and the supplemental edge CSr corresponding to the right edge is calculated thereafter; however, the order in which the supplemental edges corresponding to each of the non-detected edges may be selected as desired. For example, in the example in FIGS. 9A through 9C, the supplemental edge CSr corresponding to the right edge may be calculated first and the supplemental edge CSd corresponding to the bottom edge may be calculated thereafter. Moreover, while in the example in FIGS. 9A through 9C, described above, the supplemental edge CDd, corresponding to the bottom edge, was calculated so as to pass through the intersection between the screen frame SFi and the entire projected area frame PFi, and the supplemental edge CSr corresponding to the right edge was calculated so as to pass through the intersection between the supplemental edge CSd and the entire projected area frame PFi, the supplemental edges CS need not necessarily be calculated in this way. However, calculating the supplementary edges in this way enables the target area TA to be as large as possible, making it possible to make the displayed image on the screen SC, after the keystone correction process, as large as possible, as will be described below. Moreover, it is also possible to calculate the supplementary edges so as to maximize the size of the target area TA through the use of a system of simultaneous equations.

When the projection angle θ or ϕ is 0, the vertical vanishing point DPv or the horizontal vanishing point DPh are positioned at infinity. In such a case, the supplemental edge CS is calculated so as to be parallel to the opposite edge.

In Step S450 (FIG. 3) the aspect ratio adjusting unit 128 (FIG. 1) adjusts the aspect ratio as necessary. The adjustment to the aspect ratio is performed by changing the shape of the target area TA by moving each of the edges of the target area frame TFi of the target area TA shown in FIG. 9C. At this time, each of the edges of the target area frame TFi of the target area TA after the aspect ratio adjustment are adjusted so that the straight line extending from each edge pass through the vanishing points. The adjustment to the aspect ratio is performed so that the ratio of the height to the width of the displayed image that is displayed on the screen SC after the keystone correction process has been completed will be a specific value (for example, 3:4).

Figure 10A:
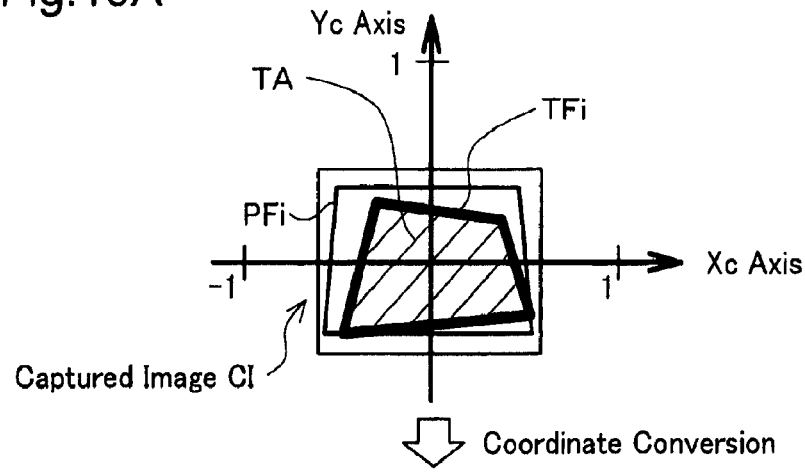
FIG. 10A through 10D are explanatory diagrams showing schematically an example of the method in which to calculate the post-correction image forming area RIF.
Figure 10B:
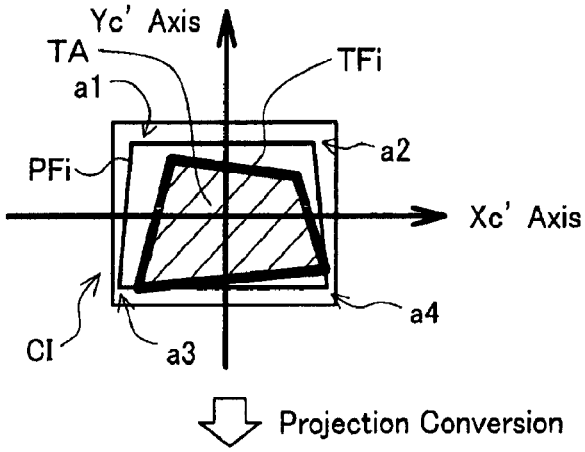

In Step S460 (FIG. 3) the post-correction image forming area calculating unit 124 (FIG. 1) calculates the post-correction image forming area RIF. FIGS. 10A through 10D are explanatory diagrams showing schematically an example of the method in which to calculate the post-correction image forming area RIF. FIG. 10A shows the state of the captured image CI after the supplemental edges have been calculated (in Step S440 of FIG. 3) and adjustment to the desired aspect ratio has been performed (Step S450 in FIG. 3). The post-correction image forming area calculating unit 124 first performs a coordinate system conversion for the captured image CI. As described above, the calculations up to this point have used a coordinate system (hereinafter known as the "Xc-Yc coordinate system") wherein the coordinate values of the points in the ±45° directions of the range of viewing angles of the CCD in the image capturing unit 180 are set to be ±1, respectively, following the Xc axis and the Yc axis. Here, this Xc-Yc coordinate system is converted into a coordinate system (hereinafter termed the "Xc'−Yc' coordinate system") wherein the pixels in the captured image CI are the units. The conversion from the Xc-Yc coordinate system to the Xc'−Yc' coordinate system can be performed using equation (12), described below. A conversion from the Xc'−Yc' coordinate system to the Xc-Yc coordinate system can be performed using equation (13), described below. FIG. 10B shows the captured image CI after coordinate system conversion.

$$(Xc', Yc') = \left(\frac{H}{\tan\Psi h}Xc + H, \frac{-V}{\tan\Psi v}Yc + V\right) \quad \Lambda(12)$$

-continued $$(Xc, Yc) = \left(\frac{\tan\Psi h}{H}(Xc' - H), -\frac{\tan\Psi v}{V}(Yc' - V)\right) \quad \Lambda(13)$$

where meanings of the various constants in equations (12) and (13) are as follows:

H: One half of the number of pixels of the CCD in the horizontal direction;

V: One half of the number of pixels of the CCD in the vertical direction;

Ψh: One half of the range of view of the CCD in the horizontal direction; and

Ψv: One half of the range of view of the CCD in the vertical direction.

Figure 10C:
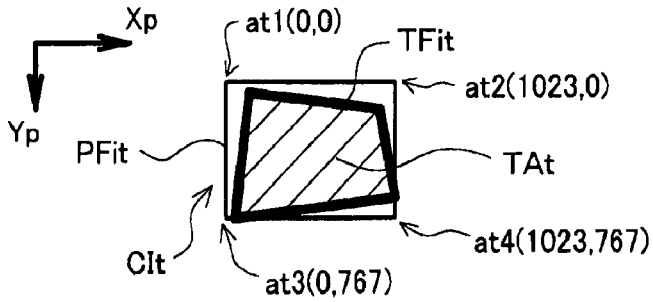

Next the post-correction image forming area calculating unit 124 performs a projection conversion of the target area frame TFi and the entire projected area frame PFi of the captured image CI. FIG. 10C shows the image (post-conversion image CIt) after the projection conversion. The projection conversion described here means a conversion of the coordinate values that describe the entire projected area frame PFi and the target area frame TFi in the Xc'-Yc' coordinate system, which is the coordinate system on the captured image CI, to coordinate values in the coordinate system that will be used as the reference. In the present embodiment, the coordinate system that serves as the reference uses the coordinate system on the liquid crystal panel 130 (hereinafter termed the "Xp-Yp coordinate system"). This projection conversion is performed in order to compensate for the misalignment of the optical axis of the lens of the CCD camera of the image capturing unit 180 from the optical axis of the projection optics system 150.

Defining the projection conversion as ϕ and using the projection conversion ϕ to convert the coordinates (Xc',Yc') into coordinates (Xp,Yp), the coordinates (Xp,Yp) after the projection conversion are given by equation (14) and equation (15), below.

$$Xp=(a\cdot Xc'+b\cdot Yc'+c)/(g\cdot Xc'+h\cdot Yc'+1) \quad \Lambda(14)$$

$$Xp=(d\cdot Xc'+e\cdot Yc'+f)/(g\cdot Xc'+h\cdot Yc'+1) \quad \Lambda(15)$$

where a, b, c, d, e, f, g, and h in equation (14) and equation (15) are constants.

First the projection conversion ϕ for converting the coordinate values of the four corners a1 to a4 of the entire projected area frame PFi in the Xc−−Yc' coordinate system on the capture image CI into coordinate values in the Xp-Yp coordinate system on the liquid crystal panel 130 is calculated. The projection conversion ϕ is established uniquely. Here, as is shown in FIG. 10C, in the present embodiment the coordinate values for the four corners at1 through at4 of the entire projected area frame PFit in the post-projection conversion Xp-Yp coordinate system are set to at1 (0,0), at2 (1023,0), at3 (0, 767), and at4 (1023,767). This is to simplify the calculations through matching the resolution of the liquid crystal panel 130 used in the present embodiment. The coordinate values of the four corners of the entire projected area frame PFit after the projection conversion need not necessarily correspond to the resolution of the liquid crystal panel 130.

Next the projection conversion ϕ that has been calculated is used to convert the coordinate values for the four corners of the target area frame TFi in the Xc'-Yc' coordinate system on the captured image CI into coordinate values in the Xp-Yp coordinate system on the liquid crystal panel 130 to calculate the post-projection-conversion target value frame TFit. In this way, the correspondence relationship between the entire projected area frame PFit and the target area frame TFit in the Xp-Yp coordinate system on the liquid crystal panel 130 is calculated. In FIG. 10C the target area TAt after the projection conversion, which is the area that is surrounded by the target area frame TFit after the projection conversion, is shown by hatching. In the explanation below the post-projection-conversion entire projected area frame PFit is termed simply the entire projected area frame PFit, the post-projection-conversion target area frame TFit is termed simply the target area frame TFit, and the post-projection-conversion target area TAt is termed simply the target area TAt.

Figure 10D:
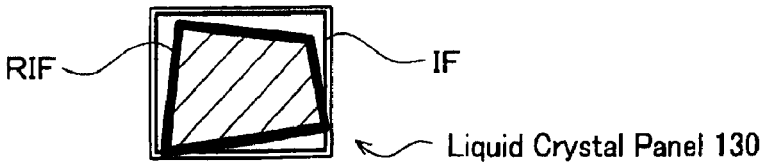

The post-correction image forming area calculating unit 124 calculates the area on the liquid crystal panel 130, as the post-correction image forming area RIF, corresponding to the target area TAt if the entire projected area frame PFit in the post-conversion image CIt is seen as the outside perimeter lines of the image forming area IF of the liquid crystal panel 130. FIG. 10D shows the post-correction image forming area RIF on the liquid crystal panel 130, as has been calculated.

In Step S470 (FIG. 3), the zoom adjusting unit 129 (FIG. 1) adjusts the zoom state as necessary. For example, in the liquid crystal panel 130 shown in FIG. 10D if the post-correction image forming area RIF is too small relative to the image forming area IF, the resolution of the liquid crystal panel 130 will not be used efficiently. In such a case, the zoom state may be shifted to the higher magnification side and the post-correction image forming area RIF may be magnified to use the resolution of the liquid crystal panel 130 effectively.

In Step S480 (FIG. 3) the keystone correction unit 127 (FIG. 1) performs the keystone correction. The keystone correction in the present embodiment is performed through forming an effective panel image PI in the area (the post-correction image forming area RIF) corresponding to the target area TAt within the image forming area IF on the liquid crystal panel 130 in order to project onto only that area (hereinafter termed the "post-correction projected area RA") of the screen SC corresponding to the target area TAt. Consequently, in the keystone correction, a conversion to align the entire projected area frame PFit with the target projected area frame TFit is calculated, and then a conversion of the input signal using the calculated conversion is performed.

Figure 11A:
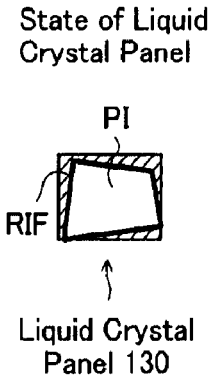
FIG. 11A through 11C are explanatory diagrams showing one example of a state of projection after the keystone correction process.
Figure 11B:
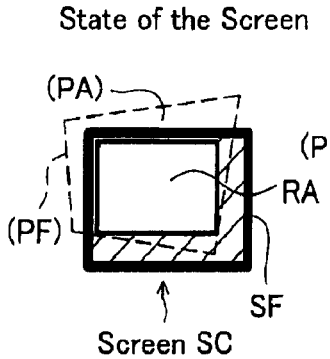
Figure 11C:
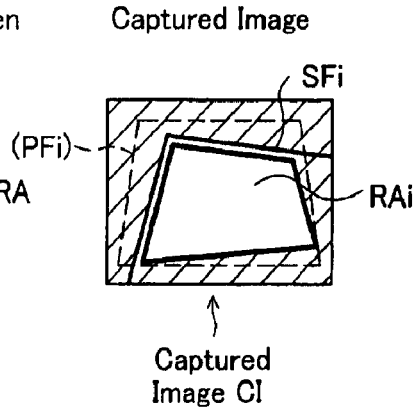

FIGS. 11A through 11C are explanatory diagrams showing one example of a state of projection after the keystone correction process. FIG. 11A shows the state of the liquid crystal panel 130, and FIG. 11B shows the state of the screen SC. FIG. 11C shows, for reference, the state of the captured image CI when an image is captured by the image capturing unit 180 of the projected state after the keystone correction process has been performed.

In the projected state after the keystone correction process has been performed, the effective panel image PI is formed in the post-correction image forming area RIF of the liquid crystal panel 130, as shown in FIG. 11A. In the area of the image forming area IF aside from the post-correction image forming area RIF, an entirely black image is formed so that the illumination light generated by the illumination optics system 140 does not pass.

At this time the displayed image is displayed on the post-correction projected area RA in the screen SC as shown in FIG. 11B. This projected image is in a state wherein it is within the screen SC and does not have trapezoidal distortion. In the area of the entire projected area PA aside from the post-correction projected area RA, image light is not projected. The captured image CI is as shown in FIG. 1C.

As explained above, the projector 100 according to the present embodiment can perform keystone correction even when only three or less edges of the screen frame SF of the screen SC could be detected from the captured images CI. As described above, detecting either the top edge or the bottom edge and at least one edge other than the top edge and the bottom edge of the screen frame SF enables the projector 100 according to the present embodiment to perform the keystone correction. The degrees of freedom of placement of the projector 100 is increased thereby. Moreover, the types (shapes) of screens SC that can be used are increased. For example, it becomes possible to perform keystone correction even when projected onto a screen SC that is long in the vertical direction.

B. Embodiment 2

Figure 12:
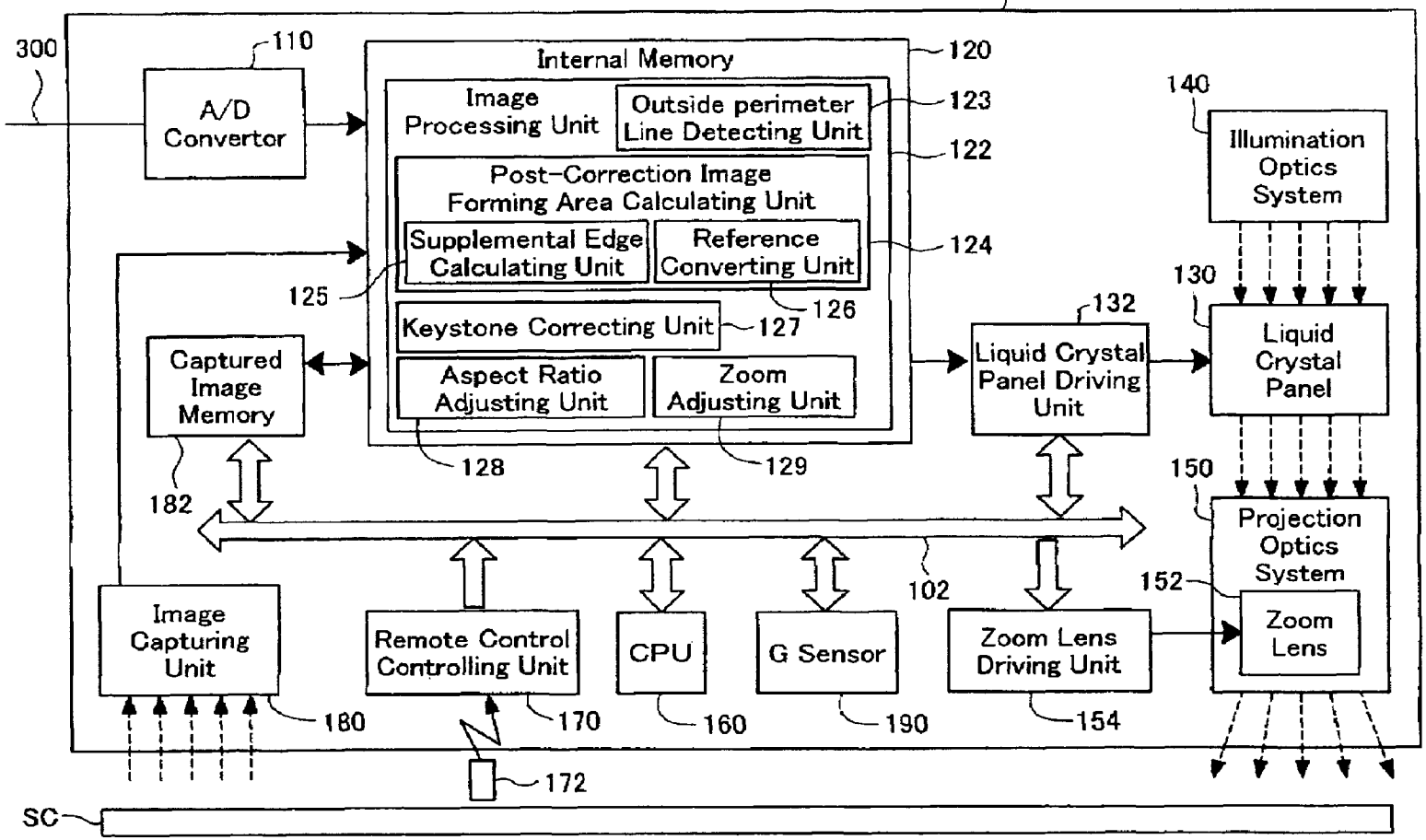
FIG. 12 is a block diagram showing schematically the structure of a projector as a embodiment 2 according to the present invention.

FIG. 12 is a block diagram showing schematically the structure of a projector as a embodiment 2 according to the present invention. The difference from the first embodiment, shown in FIG. 1, is the provision of the G sensor 190 in the projector 100. The G sensor 190 enables the detection of a tilt angle of the optical axis of the CCD of the image capturing unit 180 from the horizontal plane through detecting the tilt of the projector 100 from the vertical direction.

The projector 100 according to the embodiment 2 is able to perform a keystone correction process using the tilt angle (hereinafter termed the "sensor-detected angle") detected by the G sensor 190 as the vertical projection angle θ in the embodiment 1 described above. Consequently, the projector 100 in the embodiment 2 can perform a keystone correction process in the same manner as in the embodiment 1 as long as, of all of the edges in the screen frame SFi, either the top edge or the bottom edge is detected. In this way, in the projector 100 according to the embodiment 2 keystone correction can be performed even when even fewer of the edges (that is to say, only the top edge or the bottom edge) could be detected than in the case in the embodiment 2.

The sensor-detected angle may produce an error when, for example, the screen SC is not setup vertically, because the sensor-detected angle is a relative angle between the optical axis of the CCD of the image capturing unit 180 and the horizontal plane. Because of this, even in the projector 100 according to the embodiment 2, if it is possible to detect the top edge or the bottom edge and at least one other edge of the screen frame SFi, it is preferable to improve the accuracy of the keystone correction process through calculating the vertical projection angle θ through performing the calculating processes in the same manner as in the embodiment 1.

Figure 13:
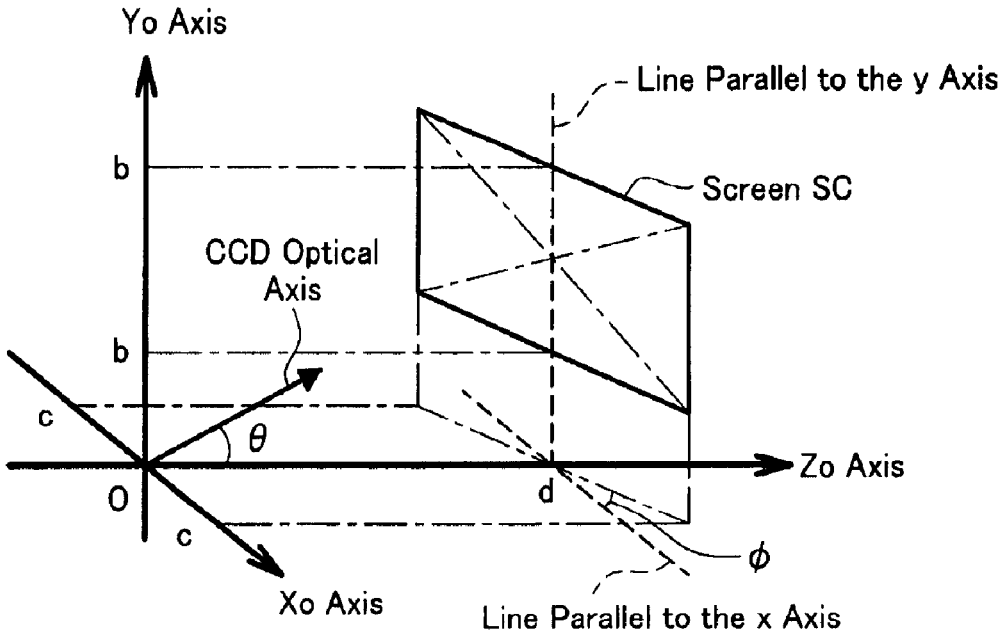
FIG. 13 is an explanatory diagram describing additionally the coordinate values for the various points on the screen SC in the explanatory diagram for the projection angles shown in FIG. 6.

C. Basis for the Formulas for Calculating the Projection Angles and for Calculating the Vanishing Points The basis for the calculations formulas for the projection angles, and the basis for the calculation formulas for the vanishing points, used in the embodiments described above, will be explained below. FIG. 13 is an explanatory diagram describing additionally the coordinate values for the various points on the screen SC in the explanatory diagram for the projection angles shown in FIG. 6. As is shown in FIG. 13, the Yo coordinate value of the top edge and the bottom edge of the screen SC is defined as b, the Xo coordinate value of the right edge and left edge of the screen SC is defined as c, and the Zo coordinate value of the center point of the screen SC is defined as d. Here, if b is large, then the edge is a top edge, and if b is small, then the edge is a bottom edge. If c is positive, then the edge is the right edge and if negative, then the edge is the left edge. At this time, the top edge or the bottom edge of the screen SC is given by equation (16), and the right edge or left edge is given by equation (17), below. Here t and s are parameters.

$$\begin{pmatrix} Xo \\ Yo \\ Zo \end{pmatrix} = \begin{pmatrix} t \\ b \\ t \cdot \tan\phi + d \end{pmatrix} \quad A(16)$$

$$\begin{pmatrix} Xo \\ Yo \\ Zo \end{pmatrix} = \begin{pmatrix} c \\ s \\ c \cdot \tan\phi + d \end{pmatrix} \quad A(17)$$

A rotation matrix is used to rotate the linear equations given above by an angle θ around the Xo axis in order to project the linear onto the CCD image capturing surface. Defining the coordinates after the rotation as (Xo', Yo', Zo'), the rotation matrix is given by equation (18) below.

$$\begin{pmatrix} Xo' \\ Yo' \\ Zo' \end{pmatrix} = \begin{pmatrix} 1 & 0 & 0 \\ 0 & \cos\theta & -\sin\theta \\ 0 & \sin\theta & \cos\theta \end{pmatrix} \begin{pmatrix} Xo \\ Yo \\ Zo \end{pmatrix} \quad A(18)$$

Next, equation (19) described below will be used to project these coordinates (Xo', Yo', Zo') onto the image-capturing surface (Xc, Yc). The coordinate system in the Z=1 plane in XYZ space which is seen as a two-dimensional plane is used as the coordinate system on the captured image CI. This can be thought of as a coordinate system wherein the 45° angles, when viewed from the center of the CCD, will be ±1.

$$\begin{pmatrix} Xc \\ Yc \end{pmatrix} = \begin{pmatrix} Xo'/Zo' \\ Yo'/Zo' \end{pmatrix} \quad A(19)$$

Transforming equations (16) and (17) using equations (18) and (19) into the image-capture plane and eliminating the parameters s and t, produces the following linear equations (20) and (21).

$$Yc = -\tan\phi\left(\frac{b \cdot \cos\theta - d \cdot \sin\theta}{b \cdot \tan\theta + d} + \sin\theta\right)Xc + \frac{b \cdot \cos\theta - d \cdot \sin\theta}{b \cdot \mathrm{sib}\theta + d \cdot \cos\theta} \quad A(20)$$

$$Yc = -\frac{1}{\sin\theta}\left(\tan\phi + \frac{d}{c}\right)Xc + \frac{1}{\tan\theta} \quad A(21)$$

While each of the edges on the screen frame SFi is given by equations (1) through (4), described above. From the equations (1) through (4) for each of the edges of the screen frame SFi and equations (20) and (21), above the equations (5) through (9) for calculating the projection angles are obtained as described above.

The formulas for calculating the vanishing points will be explained next. The vertical vanishing point DPv is the intersection of the right edge and the left edge. The right edge and the left edge differ only by the constant c in the equation (21), above. When the c for the right edge is defined as cr and the c for the left edge is defined as cl, the formula for the right edge is given by equation (22), below, and the formula for the left edge is given by equation (23), below.

$$Yc = -\frac{1}{\sin\theta}\left(\tan\phi + \frac{d}{cr}\right)Xc + \frac{1}{\tan\theta} \quad A(22)$$

-continued $$Yc = -\frac{1}{\sin\theta}\left(\tan\phi + \frac{d}{cl}\right)Xc + \frac{1}{\tan\theta} \quad A(23)$$

Solving equations (22) and (23) above, produces the equation (10) for calculating the vertical vanishing point above. It can be seen in equation (10) that the right edge and the left edge always intersect on the Y-axis.

The horizontal axis vanishing point DPh is the intersection of the top edge in the bottom edge. The top edge and the bottom edge differ only by the constant b in equation (20), above. Defining the b for the top edge as bt and the b for the bottom edge as bb, the equation for the top edge becomes equation (24) below, and the equation for the bottom edge becomes equation (25) below.

$$Yc = -\tan\phi\left(\frac{b_t \cdot \cos\theta - d \cdot \sin\theta}{b_t \cdot \tan\theta + d} + \sin\theta\right)Xc + \frac{b_t \cdot \cos\theta - d \cdot \sin\theta}{b_t \cdot \mathrm{sib}\theta + d \cdot \cos\theta} \quad A(24)$$

$$Yc = -\tan\phi\left(\frac{b_b \cdot \cos\theta - d \cdot \sin\theta}{b_b \cdot \tan\theta + d} + \sin\theta\right)Xc + \frac{b_b \cdot \cos\theta - d \cdot \sin\theta}{b_b \cdot \mathrm{sib}\theta + d \cdot \cos\theta} \quad A(25)$$

Solving the equations (24) and (25) produces equation (11) for calculating the horizontal vanishing point, as defined above.

D. Variations

The present invention is not limited to the embodiments and aspects described above. The present invention may be worked in various aspects within limits that involve no departure from the spirit of the invention; for example, the following variations are possible.

D-1. Variation 1

Although in the embodiments described above, three types of detection patterns were used to perform the detection of the entire projected area frame PFi and the screen frame SFi, this need not necessarily be done using three types of patterns. The patterns for detection may be any type of pattern insofar as it is possible to detect the entire projected area frame PFi and the screen frame SFi. Furthermore, other methods may be used also for the method for determining the entire projected area frame PFi and the screen frame SFi from the captured images CI.

D-2. Variation 2

Although in the embodiments described above, the entire projected area PA was defined as the area on which is projected the image light corresponding to entire area of the image forming area IF of the liquid crystal panel 130, the "entire area," as used here may also include a meaning of "nearly the entire area." In other words, the entire projected area PA may be defined as the area on which is projected the image light corresponding to an area that is reduced by about three pixels on each edge along each of the outside perimeter lines of the image forming area IF, smaller than the image forming area IF.

D-3. Variation 3

Although in the embodiments described above, the coordinate system on the liquid crystal panel (the Xp-Yp coordinate system) was used as the reference coordinate system in performing the projection transformation of the entire projected area frame PFi and the screen frame SFi, a different coordinate system may be used as the reference coordinate system in the projection transformation instead. Moreover, the projection transformation need not necessarily be performed, but rather maybe omitted.

D-4. Variation 4

Although in the embodiments described above, only a single liquid crystal panel 130 was shown, a plurality of liquid crystal panels 130 for a plurality of color components may be provided. An electro-optical device (such as a DMD (a trademark of Texas Instruments)) other than the liquid crystal panel may be used instead. Moreover, the projector 100 may be a CRT projector.

D-5. Variation 5

Although in the embodiments described above, the image capturing unit 180 used a CCD camera, the image capturing unit 180 may instead use, for example, a CMOS camera or a different image capturing device.

D-6. Variation 6

Although in the embodiments described above, a screen SC was used as a screen, something else may be used as a screen instead. For example, when the wall of a room is white, a rectangular frame may be formed on the wall using tape, paint, or the like, and the wall may be used as the screen. Conversely, a marker may be used to draw a black rectangle on a whiteboard, and that whiteboard may be used as the screen.

Moreover, when it comes to the color of the screen, the frame is not limited to being black, and the area inside and outside of the frame is not limited to being white but rather the frame may be white and the area inside and outside of the frame may be black. For example, chalk may be used to draw a white rectangle on a blackboard, and the blackboard may be used as the screen.

Moreover, the present invention is not limited to black and white, but rather any color combination may be used for the color of the frame and for the color inside and outside of the frame on the screen, insofar as there is a desirable contrast ratio.

D-7. Variation 7

Although in the embodiments described above, the keystone correction process was performed based on the relationship between the entire projected area PA and the screen SC, the keystone correction process may be performed using a specific projected area whereon image light is projected, corresponding to a specific area of the image forming area IF, instead of the entire projected area PA. In this case, the pattern for detection is formed in the specific area of the image forming area IF, the specific projected area is detected using the captured images CI, and the post-correction image forming area RIF is calculated based on the relationship between the specific projected area and the target area TA. Note that it is preferable to perform the keystone correction process based on the relationship between the entire projected area PA and the screen SC, as in the embodiments described above, as doing so enables the effective use of the liquid crystal panel 130.

What is claimed is:

1. A projector for displaying an image on a screen comprising:

a light source for emitting light;

an image forming panel for [forming, in an image forming area of a panel surface, an effective panel image for] modulating light that is emitted from the light source into an [effective] image light that represents an image;

an image capturing unit configured to generate a captured image by capturing at least a specific projection area wherein the image light[, corresponding to a specific area within the image forming area,] is projected;

an outside perimeter line detecting unit configured to calculate one or more edges of outside perimeter lines of the specific projection area and one or more edges of the screen, through analyzing the captured image and detecting plural points on the outside perimeter lines of the specific projection area and of the screen within the captured image;

a post-correction image forming area calculating unit configured to calculate, based on detection results by the outside perimeter line detecting unit, post-correction image forming area [that is a part of the image forming area]; and a keystone correcting unit configured to correct trapezoidal distortion of an image that is displayed on the screen through forming of the [effective panel] image in the post-correction image forming area [within the image forming area], wherein when only three or less edges among four edges of the outside perimeter lines of the screen have been detected by the outside perimeter line detecting unit, the post-correction image forming area calculating unit calculates the post-correction image forming area based on a position and a slope of the detected edge within the captured image.

2. A projector according to claim 1, wherein the post-correction image forming area calculating unit includes:

a projection angle calculating unit configured to calculate, as a projection angle, a relative angle between the projector and the screen, based on the position and the slope of the detected edge within the captured image;

a vanishing point determining unit configured to determine, based on the projection angle, a vanishing point in a specific reference coordinate system on the captured image that is a point through which any given straight lines on the screen that are parallel to a edge of the outside perimeter lines of the screen are passing; and a supplementary edge calculating unit configured to calculate a supplementary edge in the captured image, the supplementary edge forming with the detected edge of the screen a target area that is included within an area that is surrounded by the outside perimeter lines of the specific projection area, so that the supplementary edge is positioned on a line that passes through the vanishing point, wherein the post-correction image forming area calculating unit calculates the post-correction image forming area through converting the outside perimeter lines of the specific projection area within the image forming area of the panel surface using a conversion wherein the outside perimeter lines of the specific projection area are aligned with outside perimeter lines of the target area that is surrounded by the detected edge and the supplementary edge.

3. A projector according to claim 1, wherein the projection angle calculating unit calculates the projection angle using at least one of a top edge and a bottom edge and at least one edge other than a top edge and a bottom edge among the detected edges.

4. A projector according to claim 1, further comprising a vertical line angle determining unit configured to determine an angle of the projector from direction of the vertical line, wherein the projection angle calculating unit calculates the projection angle using either a top edge or a bottom edge among the detected edges and the angle that is detected by the vertical line angle determining unit.

5. A projector according to claim 2, further comprising a reference converting unit configured to convert, to a specific reference coordinate system, the outside perimeter lines of the specific projection area and the outside perimeter lines of the target area in the captured image, wherein the post-correction image forming area calculating unit calculates the post-correction image forming area using the outside perimeter lines of the specific projection area and the outside perimeter lines of the target area converted by the reference conversion unit.

6. A projector according to claim 5, wherein the reference coordinate system is a coordinate system on a surface that is parallel to the panel surface containing the image forming area.

7. A projector according to claim 1, wherein the image capturing unit generates a plurality of captured images through capturing in a plurality of states with different brightness of the screen positioned in the specific projection area, and the outside perimeter line detecting unit detects the plural points on the outside perimeter lines of the screen using the plurality of captured images.

8. A projector according to claim 7, wherein the image capturing unit captures images by holding at constant exposure when capturing images in the plurality of states.

9. An image correction method for correcting an image projected onto a screen by a projector, the projector including an image forming panel [for forming, in an image forming area of a panel surface, an effective panel image] for modulating light that is emitted from the light source into an [effective] image light that represents an image, the method comprising the steps of:

(a) generating a captured image by capturing at least a specific projection area wherein the image light[, corresponding to a specific area within the image forming area,] is projected;

(b) calculating one or more edges of outside perimeter lines of the specific projection area and one or more edges of the screen, through analyzing the captured image and detecting plural points on the outside perimeter lines of the specific projection area and of the screen within the captured image;

(c) calculating, based on detection results in the step (b), post-correction image forming area [that is a part of the image forming area]; and (d) correcting trapezoidal distortion of an image that is displayed on the screen through forming of the [effective panel] image in the post-correction image forming area [within the image forming area], wherein the step (c) includes a step of calculating, when only three or less edges among four edges of the outside perimeter lines of the screen have been detected in the step (b), the post-correction image forming area based on a position and a slope of the detected edge within the captured image.

10. A computer program product for correcting an image that is projected on a screen by a projector, the projector including an image forming panel [for forming, in an image forming area of a panel surface, an effective panel image] for modulating light that is emitted from the light source into an [effective] image light that represents an image and an image capturing unit configured to generate a captured image by capturing at least a specific projection area wherein the image light[, corresponding to a specific area within the image forming area,] is projected, the computer program product comprising:

a computer readable medium; and a computer program stored on the computer readable medium, the computer program comprising:

a first program for calculating one or more edges of outside perimeter lines of the specific projection area and one or more edges of the screen, through analyzing the captured image and detecting plural points on the outside perimeter lines of the specific projection area and of the screen within the captured image;

a second program for calculating, based on detection results by the first program, post-correction image forming area [that is a part of the image forming area]; and a third program for correcting trapezoidal distortion of an image that is displayed on the screen through forming of the [effective panel] image in the post-correction image forming area within the image forming area, wherein the second program includes a program for calculating the post-correction image forming area when only three or less edges among four edges of the outside perimeter lines of the screen have been calculated by the first program, the post-correction image forming area being calculated based on a position and a slope of the detected edge within the captured image.

*11. A projector for displaying an image on a screen comprising:*

*a light source for emitting light;*

*an image forming panel for modulating light that is emitted from the light source into an image light that represents an image;*

*an image capturing unit configured to generate a captured image by capturing at least a specific projection area wherein the image light is projected;*

*an outside perimeter line detecting unit configured to calculate one or more edges of outside perimeter lines of the specific projection area and one or more edges of the screen, through analyzing the outside perimeter lines of the specific projection area and of the screen within the captured image;*

*a post-correction image forming area calculating unit configured to calculate, based on detection results by the outside perimeter line detecting unit, post-correction image forming area; and*

*a keystone correcting unit configured to correct trapezoidal distortion of an image that is displayed on the screen through forming of the in image the post-correction image forming area,*

*wherein the post-correction image forming area calculating unit calculates the post-correction image forming area based on positions and slopes of one or more edges among edges of the outside perimeter lines of the screen detected by the outside perimeter line detecting unit.*

*12. An image correction method for correcting an image projected onto a screen by a projector, the projector including an image forming panel for modulating light that is emitted from the light source into an image light that represents an image, the method comprising the steps of:*

*(a) generating a captured image by capturing at least a specific projection area wherein the image light is projected;*

*(b) calculating one or more edges of outside perimeter lines of the specific projection area and one or more edges of the screen, through analyzing the outside perimeter lines of the specific projection area and of the screen within the captured image;*

*(c) calculating, based on detection results in the step (b), post-correction image forming area; and*

*(d) correcting trapezoidal distortion of an image that is displayed on the screen through forming of the image in the post-correction image forming area,*

*wherein the step (c) includes a step of calculating the post-correction image forming area based on positions and slopes of one or more edges among edges of the outside perimeter lines of the screen detected by the step (b).*

*13. A computer program product for correcting an image that is projected on a screen by a projector, the projector including an image forming panel for modulating light that is emitted from the light source into an image light that represents an image and an image capturing unit configured to generate a captured image by capturing at least a specific projection area wherein the image light is projected, the computer program product comprising:*

*a computer readable medium; and a computer program stored on the computer readable medium, the computer program comprising:*

*a first program for calculating one or more edges of outside perimeter lines of the specific projection area and one or more edges of the screen, through analyzing the outside perimeter lines of the specific projection area and of the screen within the captured image;*

*a second program for calculating, based on detection results by the first program, post-correction image forming area; and*

*a third program for correcting trapezoidal distortion of an image that is displayed on the screen through forming of the image in the post-correction image forming area within the image forming area,*

*wherein the second program includes a program for calculating the post-correction image forming area based on positions and slopes of one or more edges among edges of the outside perimeter lines of the screen detected by the first program.*

* * * * *